THRESHOLD CONTROL FOR SYNC SEPARATOR NOISE PROTECTION
CIRCUIT AND FOR AGC STAGE
Filed Feb. 26, 1965

INVENTORS
LUCIUS P. THOMAS
EUGENE E. JANSON
BY Eugene M. Whitacre
Attorney 3,441,669

THRESHOLD CONTROL FOR SYNC SEPARATOR NOISE PROTECTION CIRCUIT AND FOR AGC STAGE

Eugene Ernst Janson and Lucius Ponder Thomas, Indianapolis, Ind., assignors to Radio Corporation of America, a Corporation of Delaware

Filed Feb. 26, 1965, Ser. No. 435,657
Int. Cl. H04n *5/14, 5/44*
U.S. Cl. 178—7.3 7 Claims

ABSTRACT OF THE DISCLOSURE

A protective circuit is provided for disabling a television synchronizing signal separator circuit in the presence of noise. The protective circuit comprises a noise-responsive switch including a threshold diode and a transistor. The noise response threshold of the switch is controlled by means of a variable voltage supply which also serves as the threshold control for the automatic gain control (AGC) system in the television receiver.

Figures 1, 2:
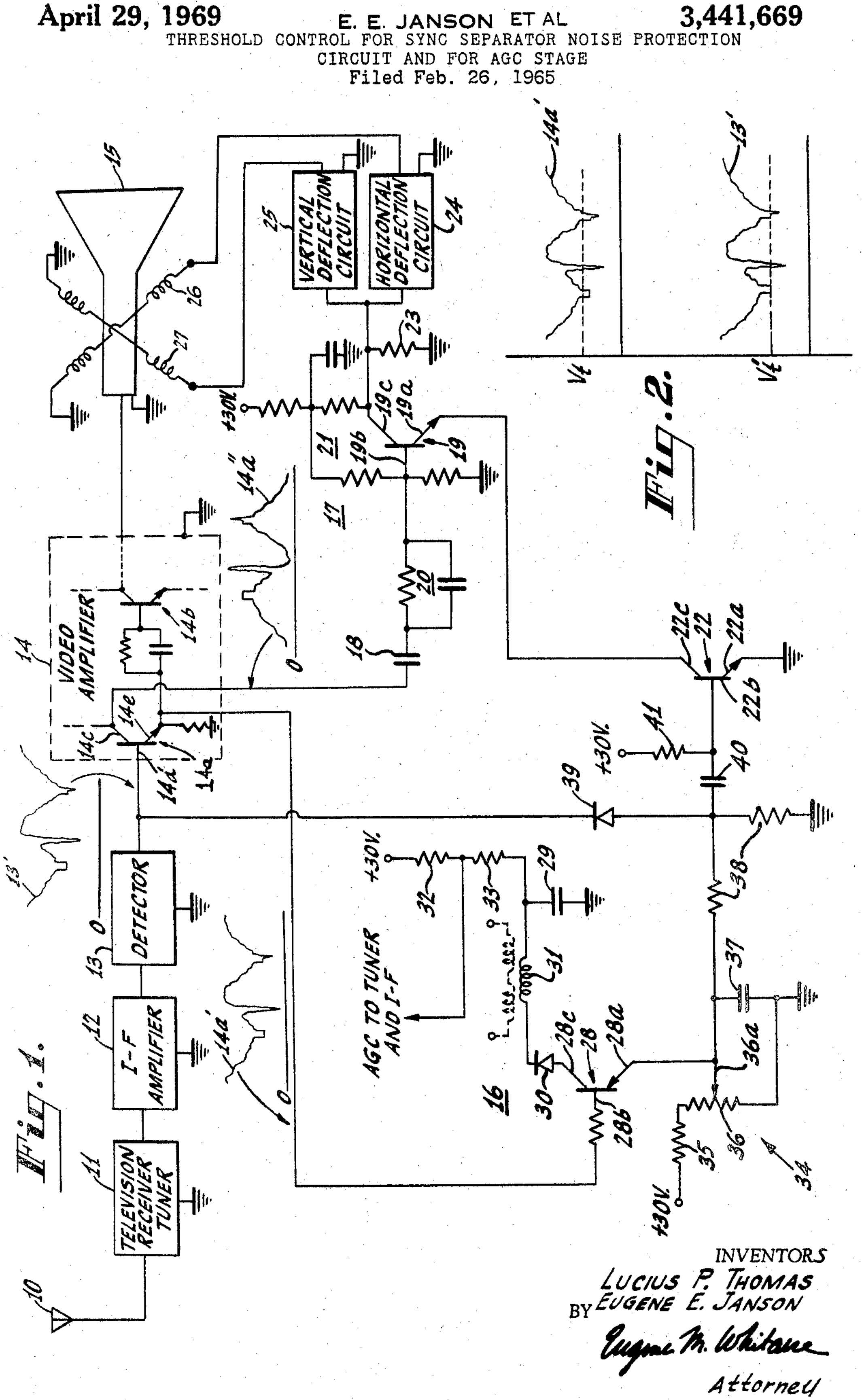

This invention relates to noise protection circuits, and more particularly to circuits for reducing deleterious effects on the synchronizing circuits of television receivers caused by the presence of noise in a television signal.

In accordance with television transmission standards, the composite television signal includes periodically recurring horizontal and vertical synchronizing pulses for synchronizing the scanning circuits associated with the kinescope in the television receiver and the scanning circuits associated with the image pick-up device at the television transmitting station. In the composite television signal, the horizontal and vertical synchronizing pulses all are of substantially the same amplitude with respect to a reference level, the reference level being defined in terms of a particular brightness condition (e.g. an arbitrary black level) in the televised image. Television receivers include a synchronizing signal separator circuit capable of differentiating between the reference or black level of the video signal and the tips of the synchronizing pulses so as to strip off or respond only to signals in a range commencing at or near the reference black level and including the sync pulses. Frequently, unwanted noise is present in the composite television signal and such noise may extend to a level beyond the sync pulse tips. Noise of such magnitude may cause spurious operation of the synchronizing circuits and/or may produce a condition in the sync separator circuit known as "noise set-up."

One commonly used type of sync separator includes an R–C self-biasing circuit which normally is charged to a D-C level such that the sync separator is responsive only to those parts of the signals extending beyond black level (e.g. sync pulses). In such circuits, noise which extends beyond the sync pulse tips may have sufficient energy to cause the R–C biasing circuit to "set up" or charge to a D-C level beyond the normal sync tip level, thereby blocking the passage of the sync pulses through the sync separator. Such a blocked condition may persist for a sufficiently long time so that synchronization of the scanning circuits is lost.

In accordance with the present invention, means are provided for disabling the synchronizing signal separator circuit whenever the composite signal supplied to the separator includes noise of an amplitude exceeding a predetermined level in one of either a positive or negative sense as the case may be in a particular circuit. The disabling means includes a threshold setting device for selecting the maximum permissible noise level. Specifically, the threshold setting device is arranged simultaneously to select the permissible noise level associated with the sync separator circuit and to set the automatic gain control (AGC) threshold level for the amplifying stages of the television receiver. The AGC circuit in the receiver, in response to the setting of the threshold device acts to maintain the sync pulse tips at the preset noise threshold level over a wide range of received signal levels.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

FIGURE 1 is a schematic circuit diagram, partially in block diagram form, of the image-reproducing portion of a television receiver embodying the invention; and FIGURE 2 is a potential waveform diagram representative of composite video signals, including image-brightness-representative signal components, regularly recurring synchronizing signal components and randomly occurring spurious noise components, observed at designated points in the circuit of FIGURE 1, the level $V_t$ being representative of a preset threshold potential.

Referring to FIGURE 1, a television receiver including a noise protection circuit constructed in accordance with the present invention comprises an antenna 10 for receiving composite television signals and for coupling such signals to a tuner 11. The tuner 11 normally includes one or more radio frequency (R–F) amplifier stages and a frequency converter for converting the amplified radio frequency signals to intermediate frequency (I–F) signals. One or more intermediate frequency amplifier stages 12 are coupled to tuner 11 and provide amplified I–F signals to a detector 13, the detector 13 serving to derive composite video signals 13' from the intermediate frequency signals. The composite signal output 13' of detector 13, which includes a D-C component, is directly coupled to a video amplifier 14 shown diagrammatically as comprising first and second transistor amplifier stages 14*a* and 14*b*, respectively. The amplified composite video signal produced by video amplifier 14 is applied to a control electrode (e.g. the cathode—not shown) of a television kinescope 15.

Transistor amplifier stage 14*a* provides, at emitter terminal 14*e* and at collector terminal 14*c*, composite video signals 14*a'* and 14*a''*, respectively, of opposite sense. The composite signal 14*a'* is directly coupled to a keyed automatic gain control (AGC) stage 16 (as well as to amplifier stage 14*b*) while the signal 14*a''* of opposite sense is coupled to a synchronizing signal separator circuit 17 by means of a coupling capacitor 18. Sync separator circuit 17 includes a transistor 19 having emitter 19*a*, base 19*b* and collector 19*c* electrodes. The composite video signal 14*a''* is coupled via capacitor 18 and an R–C self-biasing circuit 20 to base 19*b*. Collector 19*c* and base 19*b* are supplied with fixed bias potentials by means of a potential source (+30 v.) and a resistive voltage divider network 21. Emitter 19*a* is returned to ground by means for disabling transistor 19, the disabling means comprising a noise protection transistor 22. The collector 22*c* of transistor 22 is coupled directly to emitter 19*a* of transistor 19 while the emitter 22*a* of transistor 22 is grounded. The synchronizing signal output of sync separator circuit 17 is developed across a load resistor 23 and, by means of suitable time constant networks (not shown), horizontal synchronizing pulses are derived and applied to a horizontal deflection circuit 24 while vertical synchronizing pulses are derived and applied to a vertical deflection circuit 25. Horizontal and vertical deflection circuits 24 and 25 are, in turn, coupled respectively to horizontal and vertical deflection windings 26 and 27 associated with kinescope 15.

Keyed AGC stage 16, mentioned above, may be of the type shown and described in the co-pending application, Ser. No. 434,873, filed Feb. 24, 1965, in the names of Karol Siwko and Lucius P. Thomas and assigned to the same assignee as the present invention.

AGC stage 16 includes a transistor 28 having emitter 28*a*, base 28*b* and collector 28*c* electrode. Transistor 28 develops an automatic gain control potential across a capacitor 29. Capacitor 29 is coupled in the collector (or output) circuit of transistor 28 by means of the series combination of a blocking diode 30 and a secondary transformer winding 31, the winding 31 being arranged for coupling keying pulses occurring at the horizontal scanning rate to transistor 28. Winding 31 is inductively coupled to the output transformer (shown dotted) associated with horizontal deflection circuit 24. Diode 30 is poled to block conduction from capacitor 29 through the collector-base junction of transistor 28 during the intervals between keying pulses. A D-C potential +30 v. is coupled via resistances 32 and 33 to the output circuit associated with collector electrode 28*c*.

The emitter electrode 28*a* of transistor 28 is coupled to an AGC and noise threshold setting circuit 34. The threshold setting circuit 34 comprises a current limiting resistor 35 coupled in series with the parallel combination of a threshold potentiometer 36 and a storage capacitor 37. One terminal of capacitor 37 is coupled to the movable contact 36*a* of potentiometer 36, the other terminal of capacitor 37 and the end of potentiometer 36 remote from resistor 35 being grounded. A positive potential supply +30 v. is coupled to the end of resistor 35 remote from potentiometer 36. A D-C threshold potential is developed at capacitor 37 and is coupled by means of a resistive potential divider network 38 to one terminal of a noise threshold diode 39. The opposite terminal of noise threshold diode 39 is coupled to the output of detector 13. As is shown by waveform 13', the video signal output of detector 13 includes a substantial D-C component. The setting of potentiometer 34 is dependent in part upon the magnitude of the D-C component of waveform 13'. Noise threshold diode 39 is poled and biased at the plate electrode thereof so as to conduct when the video signal output 13' of detector 13 passes beyond or, in the present case, extends to a level less positive than the threshold potential established by threshold setting circuit 34 and potential divider network 38.

The junction of divider network 38 and diode 39 is coupled by means of a capacitor 40 to the base 22*b* of noise protection transistor 22. A positive bias source +30 v. is also coupled to base 22*b* by means of a resistor 41, the applied bias potential being sufficient to maintain transistor 22 in a conductive state when no signal is applied thereto via capacitor 40.

In operation, composite television signals superimposed upon a radio frequency carrier wave are received by antenna 10 and are coupled to tuner 11. The received signals are amplified and heterodyned in tuner 11 to provide intermediate frequency signals. The intermediate frequency signals are amplified by means of I-F amplifier 12, the amplified intermediate frequency signals then being applied to detector 13 wherein the composite video television signals 13', including image-representative portions, synchronizing pulses and spurious noise, are recovered from the carrier wave. For purposes of explanation, it will be assumed that the video signal 13' is characterized by maximum positive signals representative of maximum image brightness (i.e. white) and periodic synchronizing pulses which extend to a level less positive than minimum brightness representative signals. As noted above, video signal 13' also includes a substantial D-C component which may be established by means of a bias potential supply (not shown) in detector 13.

The composite video signals 13' are amplified and inverted in video amplifier 14, the resultant video signal being applied to an electrode (e.g. the cathode) of kinescope 15 to vary the electron current flow therein in accordance with the brightness of individual elements of the image which is to be reproduced.

The video signals 14*a'* and 14*a''* of opposite sense produced at emitter 14*e* and collector 14*c* are coupled, respectively, to AGC circuit 16 and to sync separator circuit 17. As is well-known in the art, video signal 14*a''* charges both capacitor 18 and the capacitor in network 20 such that the synchronizing pulses are clipped from the remainder of the video signal and are reprdouced in amplified form across load resistor 23 in the output circuit of transistor 19. Neglecting for the moment the presence of noise in the output of transistor 19, the synchronizing pulses are further separated, horizontal from vertical, in the appropriate manner by means of time constant networks (not shown) and applied to deflection circuits 24 and 25 to synchronize the generation of horizontal and vertical scanning waveforms with the application of video signals to kinescope 15.

In accordance with the present invention, means are provided for disabling synchronizing signal seaprator circuit 17 whenever noise in excess of a predetermined level is present in the video signal. The disabling means includes transistor 22, diode 39, divider network 38 and threshold setting potentiometer 36 associated with AGC circuit 16. The operation of the disabling means in conjunction with AGC circuit 16 now will be described in detail.

Coincident with the synchronizing pulse interval of the video signal 14*a'*, a flyback voltage pulse derived from the output transformer associated with horizontal deflection circuit 24 is applied via winding 31 to condition diode 30 for conduction and furthermore to reverse bias collector electrode 28*c* so as to condition AGC transistor 28 for conduction. Transistor 28 conducts during each flyback pulse if any portion of the synchronizing signal component of video signal 14*a'* is sufficiently negative with respect to the threshold potential established by the setting of movable contact 36*a* of potentiometer 36 (see FIGURE 2 and video signal 14*a'*) to produce a negative potential at base 28*b* equal to or greater than the turn-on potential for transistor 28. The extent of conduction is determined in general, by the difference between such threshold setting and the sync tip level of signal 14*a'*. Each time transistor 28 conducts, capacitor 29 is charged to a positive potential, the potential being supplied to tuner 11 and I-F amplifier 12 to control the gain of the amplifier stages thereof so as to maintain the synchronizing signal level of the video signals in fixed relationship with respect to the threshold setting of potentiometer 36 as shown in FIGURE 2. Typically, the threshold setting is approximately equal to the blanking level of the video signal 14*a'*. Sufficient conduction through transistor 28 is then obtained to maintain a substantially fixed potential on capacitor 29 between sync pulses. If the sync tips of video signal 14*a'* are more positive than the threshold setting established at potentiometer 36, transistor 28 remains nonconductive and the potential at capacitor 29 decreases exponentially. The decrease in AGC potential causes an increase in the gain of R-F and I-F amplifier stages in tuner 11 and amplifier 12 so as to bring the video signal sync tips back to the desired level with respect to the AGC setting.

As is shown in FIGURE 2, both the peak-to-peak amplitude and D-C level of video signal 14*a'* are less than the corresponding amplitude and D-C level of video signal 13'. The difference in peak-to-peak amplitude between the video signals 14*a'* and 13' results from the well-known fact that the voltage gain from base to emitter of a transistor such as transistor 14*a* is less than unity (e.g. between about 0.9 and 0.99). The D-C level of video signal 14*a'* is diminished with respect to the D-C level of video signal 13' by virtue of the base-emitter diode potential drop of transistor 14a (e.g. a fraction of a volt). In accordance with the present invention, the difference in D-C level and the resulting difference in sync tip level between video signals 14a' and 13' is employed advantageously in the following manner.

As noted above, transistor 28 in AGC circuit 16 is arranged to conduct substantially whenever any portion of video signal 14a' is less positive than the threshold potential established at potentiometer 36. In normal operation of AGC circuit 16, substantially each entire sync pulse is less positive than (i.e. extends below) the named threshold potential (see video signal 14a', FIGURE 2). Adjustment of potentiometer 36 varies the threshold potential level $V_t$ shown in FIGURE 2 and AGC circuit 16 operates to maintain the illustrated relationship between video signal 14a' and the threshold level $V_t$ over a range of settings of potentiometer 36. At the same time, since there is a substantially constant D-C potential difference between video signal 14a' and video signal 13', as noted above, AGC circuit 16 also serves to maintain the sync tip level of video signal 13' in fixed relation with respect to the threshold setting of potentiometer 36. In the circuit shown in FIGURE 1, the sync tip level of video signal 13' is maintained substantially equal to the positive potential $V_t'$ developed at the junction of the two resistors which comprise divider network 38, a potential which is proportional to but less than $V_t$ developed at movable contact 36a of potentiometer 36. It should be noted that in a given circuit application, divider network 38 may or may not be required dependent upon the amplitudes of the video signals 13' and 14a' and circuit parameters employed. As an illustration, a circuit constructed substantially as is shown in FIGURE 1 may include a voltage divider network 38 wherein a potential $V_t'$ substantially 0.8 times the threshold potential $V_t$ established at contact 36a is applied to one electrode (the plate) of diode 39. The other electrode (cathode) of diode 39 is coupled to the output of detector 13.

Since AGC circuit 16 maintains the tips of the sync pulses of video signal 13' substantially at a fixed level $V_t'$ proportional to the threshold potential $V_t$ set at potentiometer 36, diode 39 is rendered conductive whenever noise in video signal 13' exceeds the sync pulse tips (i.e. the fixed level) in a negative sense see e.g. FIGURE 2, video signal 13'). When diode 39 is rendered conductive by noise, a negative-going pulse is applied to base 22b of the noise protection transistor 22, cutting off conduction in transistor 22 and thereby disabling or rendering non-conductive the sync separator transistor 19. Since transistor 19 is cut off during the excessive noise pulse, substantially no base current flows therein and the base-emitter junction presents a relatively high impedance to ground. The external resistance coupled between base 19b and ground is also high with respect to the base-emitter impedance when transistor 19 is conductive. The charging time constant of self-biasing network 20 therefore is substantially greater when transistor 19 is disabled as compared to when transistor 19 is conductive. Since the noise pulses are of relatively short duration, the capacitor in network 20 is charged by noise to a potential substantially lower than if transistor 19 were conductive. When the noise pulse in video signal 13' subsides, diode 39 is once again rendered non-conductive, transistor 22 resumes conduction and sync separator transistor 19 is prepared for the next synchronizing pulse. The momentary disturbance of the bias produced at network 20 is quickly dissipated and the effect thereof is substantially reduced from what it would be if transistor 19 had not been disabled.

To summarize, AGC circuit 16 is rendered operative to change the D-C level of the AGC potential on capacitor 29 whenever the blanking level, of the composite video signal extends beyond a predetermined threshold level. Sync separator circuit 17, on the other hand, is rendered non-conductive whenever noise in excess of the sync tip level is present in the video signal. In accordance with the present invention, a single threshold setting device, potentiometer 36, is provided for simultaneously varying the threshold level for enabling AGC circuit 16 and for disabling sync separator circuit 17. In order to prevent noise protection transistor 22 from cutting off or disabling sync separator circuit 17 upon the occurrence of sync pulses, video signals of different levels and, if necessary, two threshold levels proportional to each other, are provided. The two different video signal levels are obtained in the illustrated embodiment by selecting for comparison with appropriate threshold levels the video input to transistor 14a and the video output produced at emitter 14e thereof, the latter signal being substantially identical to but reduced in amplitude and having a smaller D-C component with respect to the former.

Numerous other techniques may also be applied, in accordance with the present invention, for utilizing a single threshold setting device to control simultaneously the operation of the AGC circuits and a noise protection circuit associated with the sync separator of a television receiver over a wide range of input signal levels. Furthermore, the present invention is not limited to circuits wherein the signal polarities are the same as illustrated. Other signal polarities and detailed circuitry may be used in accordance with the present invention.

For example, while the invention has been illustrated in connection with a transistor video amplifier, transistor AGC circuit and transistor synchronizing signal separator circuit, it equally may be applied either to various vcauum tube or hybrid circuits (vacuum tubes in combination with transistors).

What is claimed is:

1. In a television receiver having a source of composite television video signals which include image-brightness-representative signal components, regularly recurring synchronizing signal components extending in amplitude beyond minimum image-brightness-representative signal components and randomly occurring noise components extending in amplitude beyond said synchronizing signal components, the combination comprising synchronizing signal separator means coupled to said composite video signal source for deriving said synchronizing signal components from said composite video signals, noise protection means including a noise threshold diode coupled to said video signal source and means coupled to said diode and to said synchronizing signal separator means for disabling said separator means in response to the presence in said video signals of noise components extending in amplitude beyond a predetermined threshold level, automatic gain control means coupled to said video signal source for adjusting the gain of said video signal source so as to maintain said synchronizing signal components in fixed amplitude relationship with respect to said threshold level over a wide range of input signal levels to said video signal source, and a single manually adjustable threshold setting means direct current connected to said diode and to said gain control means for adjustably selecting a bias potential determinative of said threshold level for each of said noise protection and automatic gain control means according to the normal ampliude range of said video signals.

2. In a television receiver having a source of composite television video signals which include image-brightness-representative signal components, regularly recurring synchronizing signal components extending in amplitude beyond minimum image-brightness-representative signal components and randomly occurring noise components extending in amplitude beyond said synchronizing signal components, the combination comprising synchronizing signal separator means coupled to said composite video signal source for deriving said synchronizing signal components from said composite video signals, noise protection means including a noise threshold diod coupled to said video signal source and to said synchronizing signal separator means for disabling said separator means in response to the presence in said video signals of noise components extending in amplitude beyond a predetermined threshold level, automatic gain control means coupled to said video signal source for adjusting the gain of said video signal source so as to maintain said synchronizing signal components in fixed amplitude relationship with respect to said threshold level over a wide range of input signal levels to said video signal source, and a single manually adjustable threshold setting means connected to said diode and to said gain control means for providing an adjustable bias potential determinative of said threshold level for each of said diode and said automatic gain control means.

3. In a television receiver having a source of composite television video signals which include image-brightness-representative signal components, regularly recurring synchronizing signal components extending in amplitude beyond minimum image-brightness-representative signal components and randomly occurring noise components extending in amplitude beyond said synchronizing signal components, the combination comprising synchronizing signal separator means coupled to said composite video signal source for deriving said synchronizing signal components from said composite video signals, noise protection means including a single adjustable threshold potentil source, a noise threshold diode having a first terminal direct current connected to said potential source and a second terminal direct current connected to said video signal source, and a noise protection transistor having first, second and third electrodes, said first electrode being coupled to said first terminal of said diode and said second and third electrodes being direct current connected in series relation with said synchronizing signal separator means, said noise protection means being responsive to the presence in said video signals of noise components extending in amplitude beyond a threshold potential established by said potential source to disable said separator means, and automatic gain control means coupled to said video signal source and direct current connected to said threshold potential source for adjusting the gain of said video signal source so as to maintain said synchronizing signal components in fixed amplitude relationship with respect to said threshold potential over a wide range of input signal levels to said video signal source.

4. In a television receiver, the combination in accordance with claim 3 and further comprising biasing means for maintaining said noise protection transistor normally conductive, said noise protection means being responsive to the presence in said video signals of components extending in amplitude beyond said adjustable threshold potential to render said noise protection transistor substantially nonconductive and thereby disable said separator means.

5. In a television receiver having a source of first composite television video signals which include image-brightness-representative components, regularly recurring synchronizing signal components extending in amplitude beyond minimum image-brightness-representative signal components and randomly occurring noise components extending in amplitude beyond said synchronizing signal components, the combination comprising means coupled to said video signal source for providing second composite video signals, said second composite video signals being substantially identical to but of a lesser D-C level with respect to said first composite video signals, automatic gain control means coupled to said means for providing second video signals, responsive to said second video signals and coupled to said source of first video signals for adjusting the gain of said last-named source so as to maintain a first level of said first video signals and a second level of said second video signals in fixed amplitude relationship with respect to a predetermined threshold potential over a wide range of input signal levels to said first video signal source, synchronizing signal separator means coupled to said source of first video signals for deriving said synchronizing signal components from said composite video signals, noise protection means including a noise threshold diode direct current connected to said source of first video signals and coupled to said synchronizing signal separator means for disabling said separator means in response to the presence in said first video signals of noise components extending in amplitude beyond said threshold potential, and a single threshold setting means direct current connected to said diode and to said automatic gain control means for adjustably selecting said threshold potential for each of said diode and said automatic gain control means.

6. In a television receiver having a source of first composite television video signals which include image-brightness-representative components, regularly recurring synchronizing signal components extending in amplitude beyond minimum image-brightness-representative signal components and randomly occurring noise components extending in amplitude beyond said synchronizing signal components, the combination comprising means coupled to said video signal source for providing second composite video signals, said second composite video signals being substantially identical to but of a lesser amplitude and lesser D-C level with respect to said first composite video signals, automatic gain control means coupled to said means for providing second video signals, responsive to said second video signals and coupled to said source of first video signals for adjusting the gain of said last-named source so as to maintain the synchronizing signal tips of said first video signals and the blanking level of said second video signals substantially equal to predetermined proportional threshold potentials over a wide range of input signal levels to said video signal source, synchronizing signal separator means coupled to said source of first video signals for deriving said synchronizing signal components from said composite video signal, noise protection means including a noise threshold diode direct current connected to said source of first video signals, a noise protection transistor coupled to said noise threshold diode and direct current connected to said synchronizing signal separator means, said noise protection means being responsive to the presence in said first video signals of noise components extending in amplitude beyond said synchronizing signal tips for disabling said separator means, and a single manually adjustable threshold potential setting means direct current connected to said diode and to said automatic gain control means for adjustably selecting each of said threshold potentials.

7. In a television receiver, the combination in accordance with claim 6 and further comprising biasing means for maintaining said noise protection transistor normally conductive, said noise protection means being responsive to the presence in said first video signals of noise components extending in amplitude beyond said synchronizing signal tips to render said noise protection transistor substantially nonconductive and thereby disable said separator means.

References Cited

UNITED STATES PATENTS

| | | | |
|---|---|---|---|
| 2,868,873 | 1/1959 | Splitt | 178—7.3 |
| 3,109,061 | 10/1963 | Kramer. | |

ROBERT L. GRIFFIN, *Primary Examiner.*

JOHN MARTIN, *Assistant Examiner.*